US005515650A

United States Patent [19]

Machill

[11] Patent Number: 5,515,650

[45] Date of Patent: May 14, 1996

[54] FORCE TRANSMISSION ELEMENT ON A SLIDING GATE

[76] Inventor: Rolf Machill, Carl-Schurz-Strasse 6, D-50935 Cologne, Germany

[21] Appl. No.: 225,824

[22] Filed: Apr. 6, 1994

[30] Foreign Application Priority Data

Apr. 8, 1993 [DE] Germany ............................ 9305395 U

[51] Int. Cl.[6] ............................ E05F 11/54; F16H 19/04; F16H 55/26

[52] U.S. Cl. ............................ 49/362; 74/89.17; 74/422

[58] Field of Search ............................ 74/89.17, 422; 49/362

[56] References Cited

U.S. PATENT DOCUMENTS

| | | | |
|---|---|---|---|
| 515,672 | 2/1894 | Goode et al. | 49/362 X |
| 766,393 | 8/1904 | Scales | 74/422 |
| 3,211,492 | 10/1965 | Wozena et al. | 49/362 X |
| 3,241,283 | 3/1966 | Ahlgren | 49/362 X |
| 3,289,350 | 12/1966 | Moody | 49/362 X |
| 3,464,655 | 9/1969 | Schuman | 74/89.17 X |
| 4,162,103 | 7/1979 | Georg et al. | 74/422 X |
| 5,351,441 | 10/1994 | Hormann | 74/89.17 X |

FOREIGN PATENT DOCUMENTS

| | | |
|---|---|---|
| 2399527 | 3/1977 | France . |
| 2337559 | 8/1977 | France . |
| 1559961 | 5/1973 | Germany . |
| 9100504 | 5/1991 | Germany . |

*Primary Examiner*—Allan D. Herrmann
*Attorney, Agent, or Firm*—Spencer & Frank

[57] ABSTRACT

A gate assembly includes a sliding gate, a drive having a motor and motor pinion gear for driving the sliding gate, and a force transmission element for transmitting a driving force from the drive to the sliding gate. The force transmission element includes at least one threaded bolt having a bolt head, and a toothed rack engaged with the motor pinion gear. The toothed rack includes a toothed element having a base defining a first side having teeth attached thereto, and a second side opposite to the first side and forming a groove extending in a longitudinal direction of the toothed element for accommodating the bolt head. The groove defines a groove width corresponding to a width of the bolt head. The toothed rack further includes a support element connected with the sliding gate using the at least one bolt, and that is adapted to receive the toothed element. The support element includes at least one through bore for receiving the at least one bolt.

19 Claims, 4 Drawing Sheets

FORCE TRANSMISSION ELEMENT ON A SLIDING GATE

BACKGROUND OF THE INVENTION

The invention relates to a force transmission element for a drive on a sliding gate in the form of a toothed rack for engagement by a pinion gear of the drive motor.

Up to now, toothed racks of steel were used with force transmission elements of this type, wherein it was necessary to provide lubrication for reasons of corrosion protection alone, so that continuous maintenance was required.

SUMMARY OF THE INVENTION

It is the object of the invention to design a force transmission element of the above indicated type in such a way that for all practical purposes it is maintenance-free.

This object is attained in accordance with the invention by providing a support element which can be connected with the sliding gate with which at least one toothed element made of a corrosion-resistant material is connected. This arrangement not only has the advantage that maintenance is reduced by the use of a corrosion-resistant material for the toothed element, but has the additional advantage that it is possible to provide an embodiment in which the toothed element is removably connected with the support element, so that the toothed element can be replaced after an appropriate length of operation. It is particularly useful if the toothed element is divided into several partial elements. This provides the opportunity to provide a basic profiled section for the toothed element, for example an extruded or folded section of the commercially available type and of commercially available length, so that it is only necessary to cut this profiled section to a size suitable for the respective intended use. Because of the division of the toothed elements into partial elements of 15 cm length, for example, there is then the option to produce force transmission elements of arbitrary length, also with standard elements, within the pattern given by the length of the partial elements.

It is provided in a particularly advantageous embodiment of the invention that the toothed element is made of an impact-resistant and abrasion-resistant plastic material. Because of this not only the required corrosion resistance is provided, but also the required freedom from maintenance, because such plastic toothed elements can be in engagement with either a corresponding plastic or a metal pinion gear without lubrication being necessary. A further advantage lies in that production is simplified if plastic materials which can be injection-molded or cast are used, because this provides the capability of producing partial elements in large numbers cost-efficiently. Plastic materials to be considered here are, for example, polyacetal (POM), polyamide, polyurethane (PUR), polytetrafluoroethylene (PTFE) or plastics with comparable technical properties.

It is provided in a preferred embodiment of the invention that the toothed element has a base with which the teeth are connected, and that the base has bars which laterally confine the teeth and are fixedly connected with it. A high degree of strength of shape results from the lateral bars being connected with the teeth, because the force transfer takes place not only via the root of the teeth but also via the bars laterally connected with the teeth. With the same load carrying ability, this creates the possibility of employing tooth elements of smaller dimensions.

It is provided in a further embodiment of the invention that the base of the toothed element is equipped on its side facing away from the teeth with a rear groove extending in the longitudinal direction. This not only results in a reduced use of material without negatively affecting sturdiness, but also the capability to provide space for the disposition of fastening means by means of this groove. In this connection it is preferably provided that the support element is embodied as a C-profile section and that the toothed element is fastened in the C-profile section.

It is further provided in a preferred embodiment of the invention that the C-profile section of the support element is equipped on both ends with detent pieces for the toothed element and that at least one detent piece is embodied so that it can be braced in the longitudinal direction. This embodiment has the advantage, particularly when using several partial elements, that the toothed element or the partial elements need only be loosely inserted into the C-profile section and are then firmly braced in the C-profile section in the longitudinal direction by means of the detent pieces. This furthermore has the advantage that in case of possible damage to the toothed element or the partial elements it is possible, by loosening one detent piece, to pull the partial elements out in a simple way and replace them with new ones.

It is provided in a further preferred embodiment of the invention that the partial element which in the closed position of the sliding gate is in engagement with the pinion gear of the drive consists of a metallic material. Since as a rule gear motors, in particular worm gear motors, are employed as drive motors, which make displacement impossible if a force acts on the sliding gate from the outside, this embodiment offers the advantage that the gate is locked in the closed position and cannot be forced open from the outside. While in this case destruction of the teeth over at least a partial length would be possible in case partial elements of plastic were exclusively used, the use in the above described manner of a partial element made of a metallic material offers sufficient resistance against force, so that dependable locking is assured.

In an embodiment of the invention it is furthermore provided that the C-profile section is equipped with through-bores for threaded bolts on its back and that the width of the rear groove of the toothed element corresponds to the width across the head of the threaded bolt to be used. Assembly is considerably eased by this, because on the one hand the through-bores of a cut-to-size C-profile section can be drilled in any arbitrary manner to conform to the requirements of the sliding gate to be equipped. The threaded bolts are subsequently pushed through from the open side of the C-profile section and the partial elements are then inserted, wherein the rear groove interlockingly encloses the respective head of the inserted threaded bolt. Not only is the structural height of the C-profile section to be used reduced by this, but an assembly aid is created at the same time, since the inserted toothed element simultaneously serves as a torque receiver for the threaded bolt, so that the required assembly nuts can be threaded on here in a simple manner.

In a further embodiment it is provided that the support element is equipped with a hollow rail on its side facing away from the toothed element, in which electrical control lines are arranged and in which a sliding part is guided, which projects outwardly with a shoulder through an elongated slit, wherein the shoulder can be fastened to a fixed part of the gate and is used as a connecting element for the control lines between the movable and the fixed parts of the gate. This gives the capability of integrating the required control lines, such as the security devices on sliding gates, for example a contact rail disposed on the front, into the force transmission element and to create a dependable protection against environmental effects of every type. Because the support element is designed in such a way that, on the one hand, the toothed element and, on the other, the control lines for such switching devices are disposed in one component, the capability of pre-assembly in the shop is the result here, so that at the site it is merely necessary to bolt the support element on and to make the required connections. This also allows it to make very quick repairs by replacing the complete component. Since the gate part moves together with the support element, while the sliding part together with its shoulder used as a connecting element remains stationary, it is necessary to provide length compensation capabilities corresponding to the length of movement of the gate part for the control lines housed in the hollow rail. This can be either accomplished in that the control line is helically coiled during production, so that the control line can be pulled open in the manner of a helical spring and the required change in length between the movable gate part and the stationary shoulder part is assured in this way.

However, in a special embodiment of the invention it is provided that guide means for the control lines are disposed in the hollow rail. Such guide means can be constituted by so-called cable drag chains, for example, which are carried in the hollow profile section.

In a particularly practical embodiment of the invention it is provided that the hollow rail is embodied so it can be longitudinally divided and one part be used as a cover. This arrangement offers the capability of providing free access to the control lines or the guide means for the control lines in the hollow rail without having to detach the entire force transmission element, so that it is possible here to easily repair malfunctions at the site.

BRIEF DESCRIPTION OF THE INVENTION

The invention will be described in detail by means of schematic drawings of an exemplary embodiment. Shown are in:

FIG. 1, a sliding gate with a top view of the force transmission element,

FIG. 2, a vertical section through the force transmission element taken along lines II—II of FIG. 1, FIG. 3, a longitudinal section through the force transmission element taken along lines III—III of FIG. 2, FIG. 4, a partial perspective view of the toothed element shown in FIG. 2, FIG. 5, a cross section through an alternative embodiment of the force transmission element shown in FIG. 2, but with a hollow rail for control lines, FIG. 6, an alternative embodiment of the force transmission element shown in FIG. 2, and having a pinion gear as a support wheel.

DETAILED DESCRIPTION OF THE INVENTION

Figure 1:
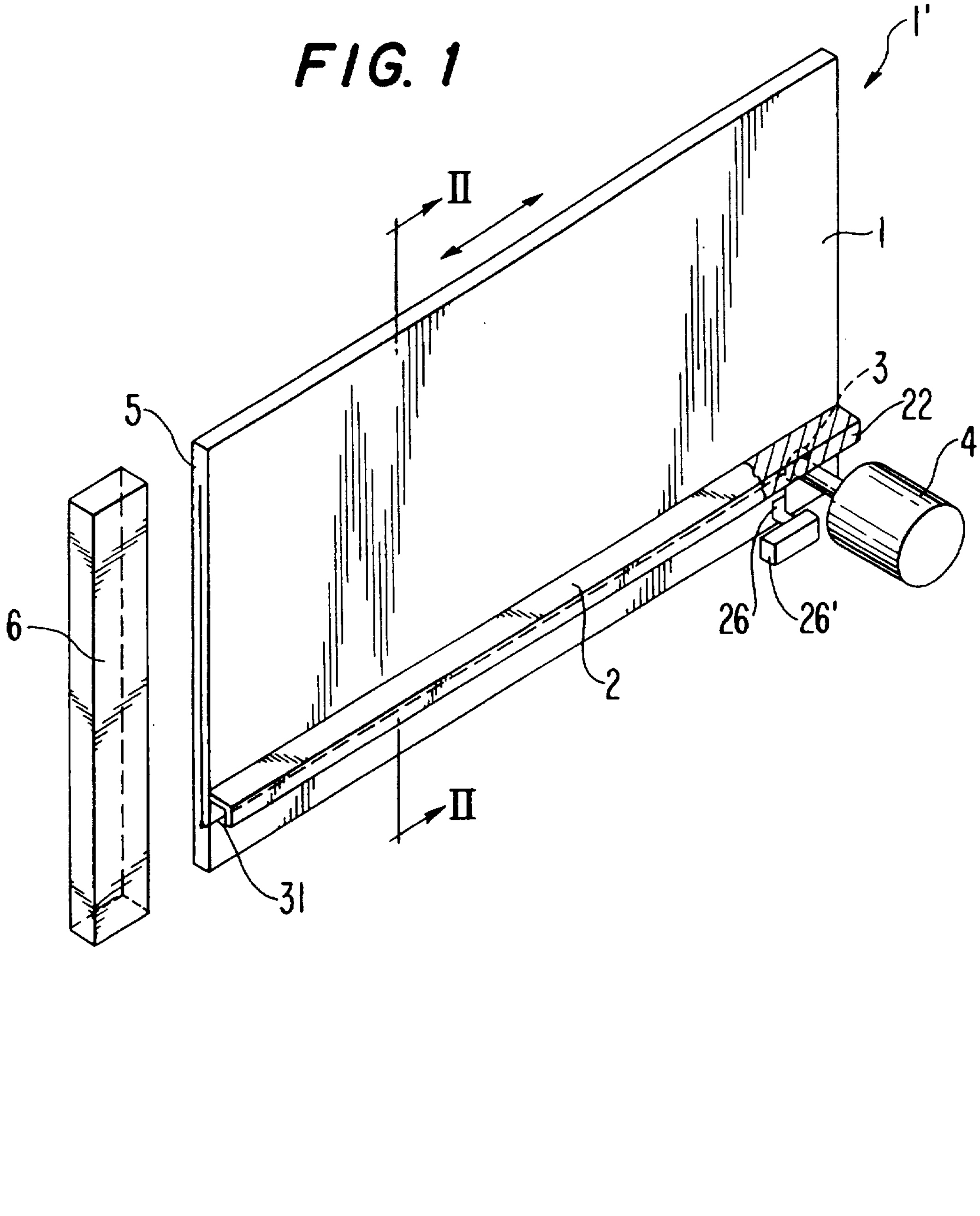
Figure 2:
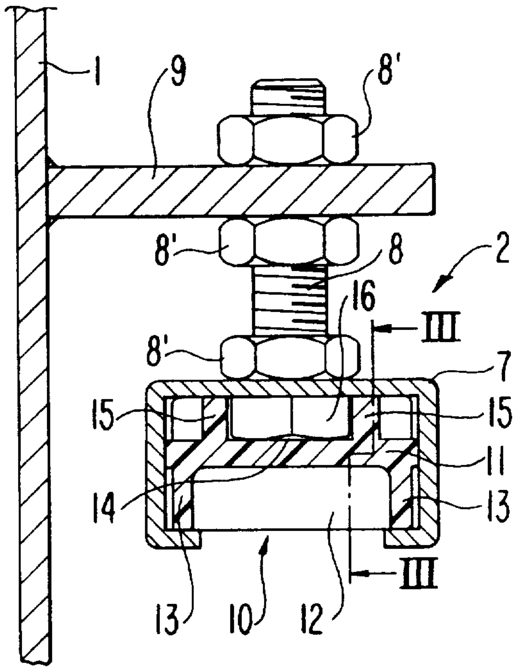

As can be seen in FIG. 1, a sliding gate essentially consists of a gate element 1, guided in a sliding bearing not shown in detail here, which is connected with a force transmission element 2. The force transmission element 2 is embodied as a toothed rack and is in engagement with the pinion gear 3 of a drive motor 4. A security device, for example in the form of a contact rail 5 (shown schematically), is attached to the front of the sliding gate 1', by means of which it must be assured that during a closing movement of the sliding gate the motor is immediately stopped when the gate encounters an obstruction. In the closed position the gate element 1 rests against a corresponding free-standing column 6. The cross section in accordance with FIG. 2 represents a preferred embodiment of the force transmission element. In the preferred embodiment the force transmission element 2 consists of a support element 7 in the form of a C-profile section made of metal, preferably stainless steel, which is fixedly connected via threaded bolts 8 and a shoulder 9 with the gate element 1. A toothed element 10 has been inserted into the support element embodied as a C-profile section. In this case the toothed element 10 has a base 11 with which the teeth 12 are connected. At the same time bars 13, which laterally confine the teeth 11, are connected with the base 12 and are also connected in one piece with the ends 12" of the teeth 12, so that the base 11 with the lateral bars 13 and the teeth 12 has a box-shaped profile, as shown in the perspective view of FIG. 4. Thus, the teeth 12 are fixedly connected with the base 11 not only by their roots 12', but also with their ends 12", so that this provides a high degree of strength of shape.

Furthermore, the back of the base 11 is provided with a rear groove 14 (FIG. 4), which in the exemplary embodiment shown is formed by two longitudinally extending bars 15. The width of the rear groove 14 is of such a size that it corresponds to the width across the bolt head 16 of the threaded bolt 8.

The force transmission element is now assembled in such a way that first the required through-bores for the threaded bolts 8 are drilled at the desired spacing, then the threaded bolts 8 are inserted and afterwards the toothed element 10 is inserted. In this case the toothed element 10 can be made of one piece and inserted over the entire length of the C-profile section 7. However, it is more advantageous to divide the toothed elements 10 into individual partial elements 10' which are inserted into the C-profile section one after the other. As shown in FIG. 2, the inserted toothed element secures the bolt head 16 of the threaded bolt 8 against falling out as well as against turning, so that subsequently the fastening nuts 8' shown can be threaded on and tightened without auxiliary tools.

Figure 3:
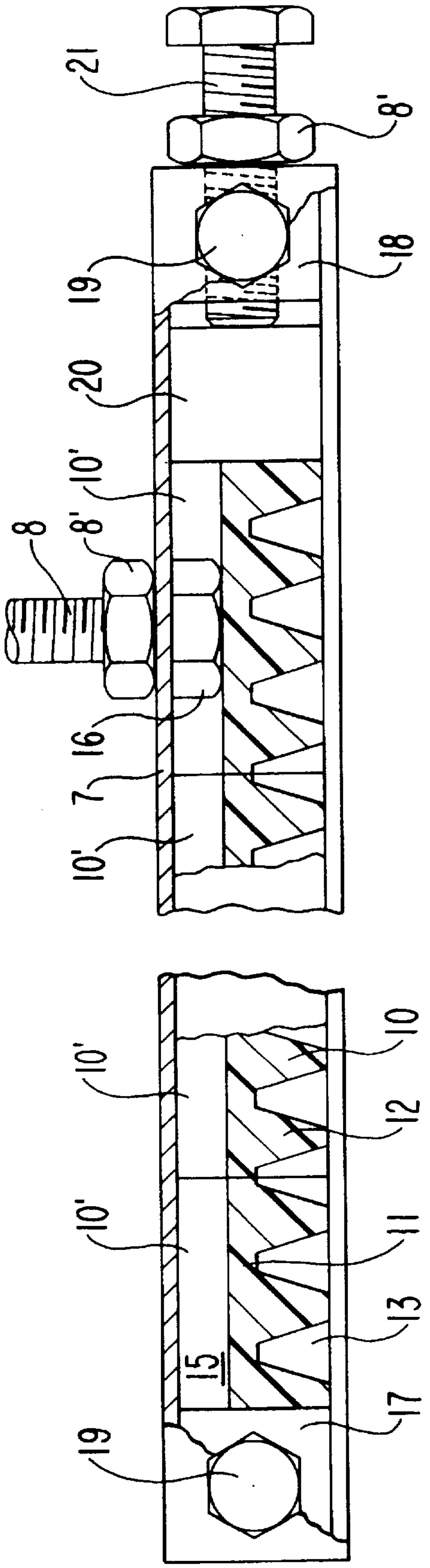

As the longitudinal section in FIG. 3 shows, the C-profile section of the support element 7 is provided with detent pieces 17 and 18 on both ends, which have been screwed into the profile section and are fixedly connected via transversely extending bolts 19 with the C-profile section of the support element 7. The detent piece 17 is the first one to be inserted and fastened. Subsequently the threaded bolts 8 and the partial elements of the toothed elements are inserted into the C-profile section in the previously described manner. Subsequently a pressure piece 20 is inserted and then the detent piece 18 is connected with the C-profile section. In this case the detent piece 18 is provided with an axially guided clamping bolt 21, by means of which it is possible to securely brace the partial elements constituting the toothed element 10 in the C-profile section via the pressure piece 20. It can furthermore be seen in FIG. 3 that by simply removing the detent piece 18 and without having to remove the support element from the gate element 1 it is possible at any time to pull out the toothed element 10 or individual partial elements from the C-profile section and to replace them with new ones.

Figure 4:
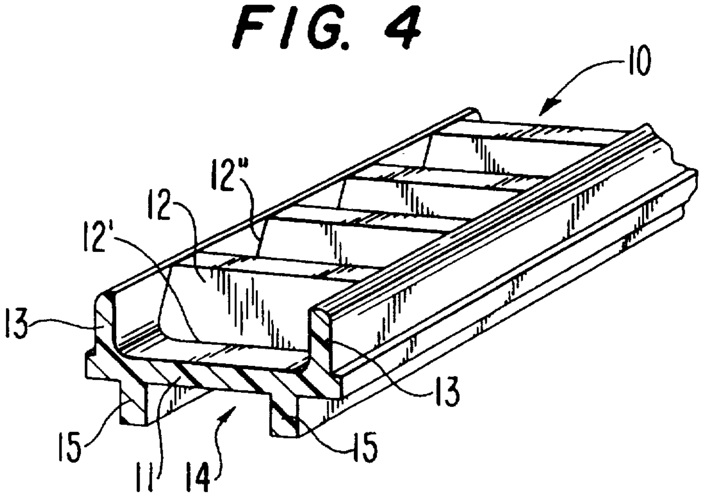

FIG. 4 makes it clear that the partial elements for the toothed element are preferably cast from a plastic material or are injection molded. Particularly suited for this are plastics such as polyacetals, polyamides, polytetrafluoroethylenes or polyurethanes, which have the required high stability but also good sliding properties.

It is particularly practical when using toothed elements of plastic if the partial element which in the closed position of the sliding gate 1 is in engagement with the drive pinion gear 3 consists of a metallic material. The respective partial metallic element 22 has been indicated by cross-hatching in FIG. 1. Since the drive motor 4 is embodied as a worm gear motor and is therefore self-locking, it is not possible to displace the sliding gate manually against the motor. Now, in order to prevent that the closed gate 1' can be forcibly opened at least for a short distance for forming a gap and that the toothed elements of plastic are destroyed, the disposition of a metallic partial element 22 for the range of the closed position simultaneously offers a securing of the gate 1', since it is very difficult to destroy the engagement of the teeth of a metallic toothed element and the metallic drive pinion gear, even by means of a large lever tool.

Figure 5:
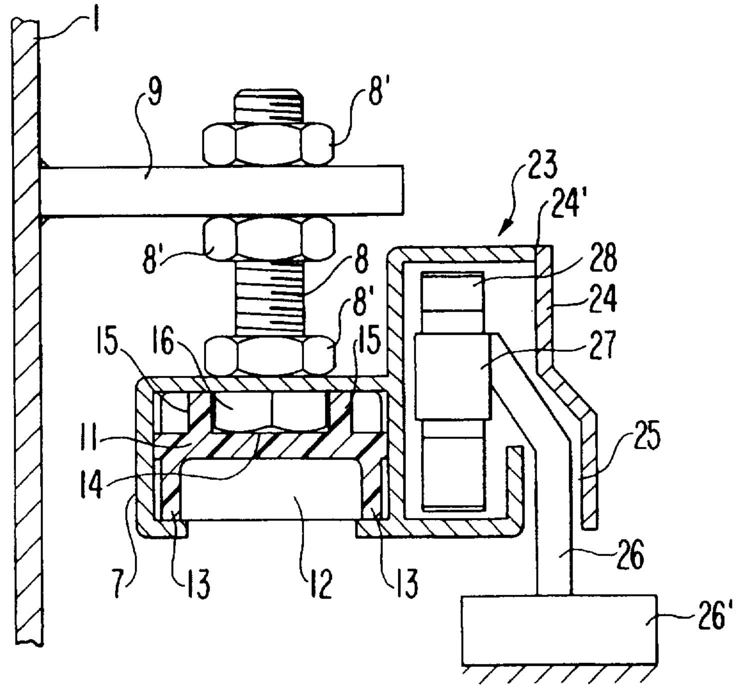

A further embodiment of the force transmission element is shown in cross section in FIG. 5. In this embodiment a hollow rail 23 is formed on the C-profile section of the support element 7 which was made as an extruded profile section. In this case the hollow rail 23 is embodied to be longitudinally divided at 24', so that a removable cover part 24 is provided which allows free access to the interior of the hollow rail. In this case the cover part 24 is embodied in such a way that an elongated slit 25 is left open, through which a shoulder 26 of a sliding piece 27 is carried to the outside. In this case the shoulder 26 constitutes a connecting element for a control line 31 carried in the hollow rail 23, one end of which is connected with the contact rail 5 of the gate 1 (FIG. 1) and the other end of which is connected via the shoulder 26 connected with a stationary gate part 26' with a control and switching device, which itself is connected with the drive motor 4. This is schematically indicated in FIG. 1 by means of the representation of the shoulder 26. The length compensation for the control line disposed in the hollow rail, which is required by the movement of the gate between the closed position and the open position, is provided in the exemplary embodiment illustrated in that the control line is disposed in a cable drag chain 28 which is maintained in the hollow rail 23.

However, the hollow rail 23 can also have an essentially circular cross section with a longitudinal slit, so that the control line in the form of a helically-resiliently-coiled element can be directly inserted into the hollow rail 23. In the closed position the resilient coil is pulled open, while the resilient coil is contracted in the open position.

Figure 6:
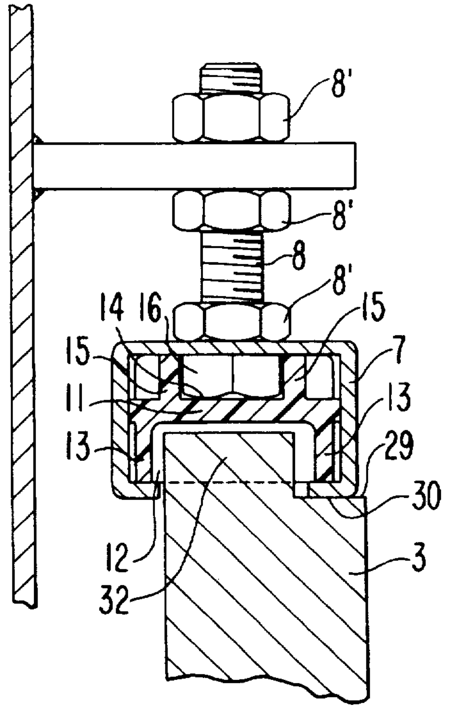

As shown in FIG. 6, the C-profile section of the support element 7 furthermore offers the capability to provide the pinion gear 3 of the drive motor 4 with at least one tracking and/or support rim 29 which rests on a rim 30 of the C-profile section. Because of this, defined engagement conditions, which can be optimized, result between the toothed element 10 and the toothing 32 of the pinion gear 3, which have an advantageous effect on the service life. In this case it can be practical if the drive motor 4 is seated on a rocker, so that the tracking rim of the pinion gear 3 is pressed against the C-profile section by a pressure spring. But the detent on the rocker assures that a minimum engagement between the pinion gear and the toothed element is maintained.

Instead of or in addition to the pressure spring, it is also possible in this modified form to assign a mating gear to the pinion gear which, with an appropriate design of the fastening means for the support element, runs on the top of the C-profile section. In this way the C-profile section is "clamped" between the pinion gear and the mating gear, so that the motor, seated on the rocker and also connected with the mating gear, is always brought along by the mating gear if, for example, because of deposits or the formation of ice on the rails, the sliding gate moves on a somewhat higher level. The pinion gear is always in an exactly defined engagement in the toothed element. In the exemplary embodiment illustrated, the toothed element, including the teeth, is enclosed in the C-profile section and therefore protected to the greatest extent.

I claim:

1. A gate assembly comprising a sliding gate, a drive having a motor and motor pinion gear for driving the sliding gate, and a force transmission element for transmitting a driving force from the drive to the sliding gate, said force transmission element comprising:

at least one threaded bolt having a bolt head; and a toothed rack engaged with the motor pinion gear, said toothed rack comprising:

a toothed element having a base defining a first side having teeth attached thereto, and a second side opposite to the first side and forming a groove extending in a longitudinal direction of said toothed element for accommodating said bolt head, the groove defining a groove width corresponding to a width of said bolt head; and a support element connected with the sliding gate using said at least one bolt, being adapted to receive said toothed element, and including at least one through bore for receiving said at least one bolt.

2. The gate assembly defined in claim 1, wherein said toothed element comprises a plurality of partial tooth elements.

3. The gate assembly defined in claim 1, wherein said toothed element comprises a plastic material.

4. The gate assembly defined in claim 1, wherein the base of said toothed element includes a plurality of longitudinally extending bars, each laterally confining the teeth and being fixedly connected thereto.

5. The gate assembly defined in claim 1, wherein said support element has a C-shaped sectional profile having said toothed element fastened therein.

6. The gate assembly defined in claim 5, wherein said force transmitting element further comprises a plurality of detent pieces, each being received in a respective end of the C-shaped sectional profile of said support element for retaining said toothed element in place, at least one of said detent pieces being braced in the longitudinal direction.

7. The gate assembly defined in claim 1, wherein said toothed element comprises a plurality of partial tooth elements, one of said partial tooth elements being in engagement with the motor pinion gear when the sliding gate is in a closed position, said one partial tooth element being comprised of a metallic material.

8. A gate assembly comprising a sliding gate, a fixed portion, a drive having a motor and motor pinion gear for driving the sliding gate, and a force transmission element for transmitting a driving force from the drive to the sliding gate,-said force transmission element comprising:

a sliding piece;

a shoulder portion projecting outwardly relative to the sliding gate, and having one end attached to said sliding piece, and another end fixed to the fixed portion to form a connecting element of an electrical control line electrically connecting the sliding gate and the fixed portion together; and a toothed rack engaged with the motor pinion gear, said toothed rack comprising:

a toothed element; and a support element connected with the sliding gate and having one side adapted to receive said a toothed element, and having another side forming a hollow rail for accommodating the electrical control line and for receiving and guiding said sliding part, said hollow rail including an elongated slit having said shoulder portion projecting therethrough.

9. The gate assembly defined in claim 8, wherein said toothed element comprises a plurality of partial tooth elements.

10. The gate assembly defined in claim 8, wherein said toothed element comprises a plastic material.

11. The gate assembly defined in claim 8, wherein the one side of said support element has a C-shaped sectional profile having said toothed element fastened therein.

12. The gate assembly defined in claim 11 wherein said force transmitting element further comprises a plurality of detent pieces, each being received in a respective end of the C-shaped sectional profile of said support element for retaining said toothed element in place, at least one of said detent pieces being braced in the longitudinal direction.

13. The gate assembly defined in claim 8, wherein said toothed element comprises a plurality of partial tooth elements, one of said partial tooth elements being in engagement with the motor pinion gear when the sliding gate is in a closed position, said one partial tooth element being comprised of a metallic material.

14. The gate assembly defined in claim 8, wherein said toothed rack includes guide means located within the hollow rail for guiding the electrical control line.

15. The gate assembly defined in claim 8, wherein the hollow rail is longitudinally divisible to form a cover.

16. A gate assembly comprising a sliding gate, a drive having a motor and motor pinion gear for driving the sliding gate, and a force transmission element for transmitting a driving force from the drive to the sliding gate, said force transmission element comprising:

a toothed rack engaged with the motor pinion gear, said toothed rack comprising:

a toothed element subdivided into a plurality of partial tooth elements;

a support element connected with the sliding gate, and being adapted to receive said toothed element; and a plurality of detent pieces, each being received in a respective end of said support element for retaining said toothed element in place, at least one of said detent pieces including means for exerting a force against an adjacent partial tooth element so that said plurality of partial tooth elements are braced against one another in said support element.

17. The gate assembly defined in claim 16, wherein said toothed element comprises a plastic material.

18. The gate assembly defined in claim 16, wherein said support element has a C-shaped sectional profile having said toothed element fastened therein.

19. The gate assembly defined in claim 16, wherein one of said partial tooth elements is in engagement with the motor pinion gear when the sliding gate is in a closed position, said one partial tooth element being comprised of a metallic material.

* * * * *